US011822996B2

(12) United States Patent
Austin

(10) Patent No.: US 11,822,996 B2
(45) Date of Patent: Nov. 21, 2023

(54) MONITORING A DOOR POSITION TO DETERMINE A STATUS OF A RADIO FREQUENCY IDENTIFICATION TAG

(71) Applicant: ZEBRA TECHNOLOGIES CORPORATION, Lincolnshire, IL (US)

(72) Inventor: Timothy B. Austin, Stony Brook, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 143 days.

(21) Appl. No.: 17/538,577

(22) Filed: Nov. 30, 2021

(65) Prior Publication Data

US 2023/0177287 A1    Jun. 8, 2023

(51) Int. Cl.
*G08B 21/00* (2006.01)
*G06K 7/10* (2006.01)
*G06K 19/07* (2006.01)
*G06K 19/04* (2006.01)

(52) U.S. Cl.
CPC ..... *G06K 7/10099* (2013.01); *G06K 7/10415* (2013.01); *G06K 19/041* (2013.01); *G06K 19/0724* (2013.01)

(58) Field of Classification Search
CPC ........... G06K 7/10099; G06K 7/10415; G06K 19/041; G06K 19/0724
See application file for complete search history.

(56) References Cited

U.S. PATENT DOCUMENTS

| | | | | |
|---|---|---|---|---|
| 2008/0231459 A1* | 9/2008 | Corder | ................... | G07C 5/008 340/572.7 |
| 2010/0225482 A1* | 9/2010 | Kasai | ................... | H01Q 1/2225 340/572.1 |
| 2010/0237989 A1* | 9/2010 | Ikegami | ................... | G07C 9/27 340/5.61 |
| 2011/0063113 A1* | 3/2011 | Hook | ...................... | G01S 13/82 340/572.1 |
| 2018/0173912 A1* | 6/2018 | Duron | ................ | G06K 7/10425 |
| 2023/0040166 A1* | 2/2023 | Zomchek | ................ | G07C 9/28 |

* cited by examiner

*Primary Examiner* — Mark S Rushing

(57) ABSTRACT

In some implementations, a system may receive door position information that indicates a position of a door of a room. The system may receive, in association with a read operation of an RFID reader, first tag information associated with a first RFID tag, wherein the first tag information is received via a first antenna of the RFID reader, and wherein the RFID reader is disposed within the room and a first directional range of the first antenna is directed toward the door. The system may determine, based on the first tag information being received via the first antenna, a location status of the first RFID tag according to the door position information. The system may perform, based on the location status, an action associated with indicating a location of the first RFID tag.

18 Claims, 9 Drawing Sheets

MONITORING A DOOR POSITION TO DETERMINE A STATUS OF A RADIO FREQUENCY IDENTIFICATION TAG

BACKGROUND

A radio frequency identification (RFID) system uses an RFID tag and an RFID reader that identifies the tag. The RFID reader may include one or more antennas that emit read signals and receive response signals from the RFID tag. The read signals may correspond to beacons to detect and/or identify RFID tags that are within a communication range of the RFID reader.

Based on characteristics of tag readings associated with received response signals from an RFID tag during a read window (e.g., a period of time after a read signal is emitted), the RFID reader may determine and/or indicate a location or a direction of movement of the RFID tag, relative to a location of the RFID reader. Accordingly, to accurately determine a location and/or a direction of movement of an RFID tag within an environment, there is a need for an RFID system to determine and/or verify that the readings of a read window accurately indicate the location and/or the movement of the RFID tag.

SUMMARY

Some implementations described herein relate to a method for processing radio frequency identification (RFID) tag information. The method may include receiving door position information that indicates a position of a door of a room. The method may include receiving, in association with a read operation of an RFID reader, first tag information associated with a first RFID tag, where the first tag information is received via a first antenna of the RFID reader, and where the RFID reader is disposed within the room and a first directional range of the first antenna is directed toward the door. The method may include determining, based on the first tag information being received via the first antenna, a location status of the first RFID tag according to the door position information. The method may include performing, based on the location status, an action associated with indicating a location of the first RFID tag.

Some implementations described herein relate to an RFID reader. The RFID reader may include a plurality of antennas, one or more memories, and one or more processors, coupled to the one or more memories. The RFID reader may be configured to receive door position information that indicates a position of a door of a room. The RFID reader may be configured to perform a read operation to identify RFID tags. The RFID reader may be configured to receive, based on the read operation, first tag information associated with a first RFID tag. The RFID reader may be configured to generate, based on the position of the door and the first tag information being received via the first antenna, tag data that indicates an antenna identifier associated with the first tag information. The RFID reader may be configured to perform an action associated with the tag data to enable a location of the first RFID tag to be identified according to the read operation.

Some implementations described herein relate to a system. The system may include a door monitor that is configured to indicate a position of a door and an RFID reader that includes a first antenna and a second antenna, where the first antenna is disposed, within a room, nearer the door than the second antenna. The system may include a management device. The management device may be configured to receive, from the door monitor, door position information that indicates a position of the door. The management device may be configured to receive, in association with a read operation of the RFID reader, first tag information associated with a first RFID tag and second tag information associated with a second RFID tag. The management device may be configured to determine, based on the first tag information being received via the first antenna, a location status of the first RFID tag according to the door position information. The management device may be configured to determine, based on the second tag information being received via the second antenna, that the second RFID tag is located within the room. The management device may be configured to perform, based on the location status, an action associated with indicating a location of the first RFID tag and indicating that the second tag is located within the room.

DETAILED DESCRIPTION

Figure 1A:
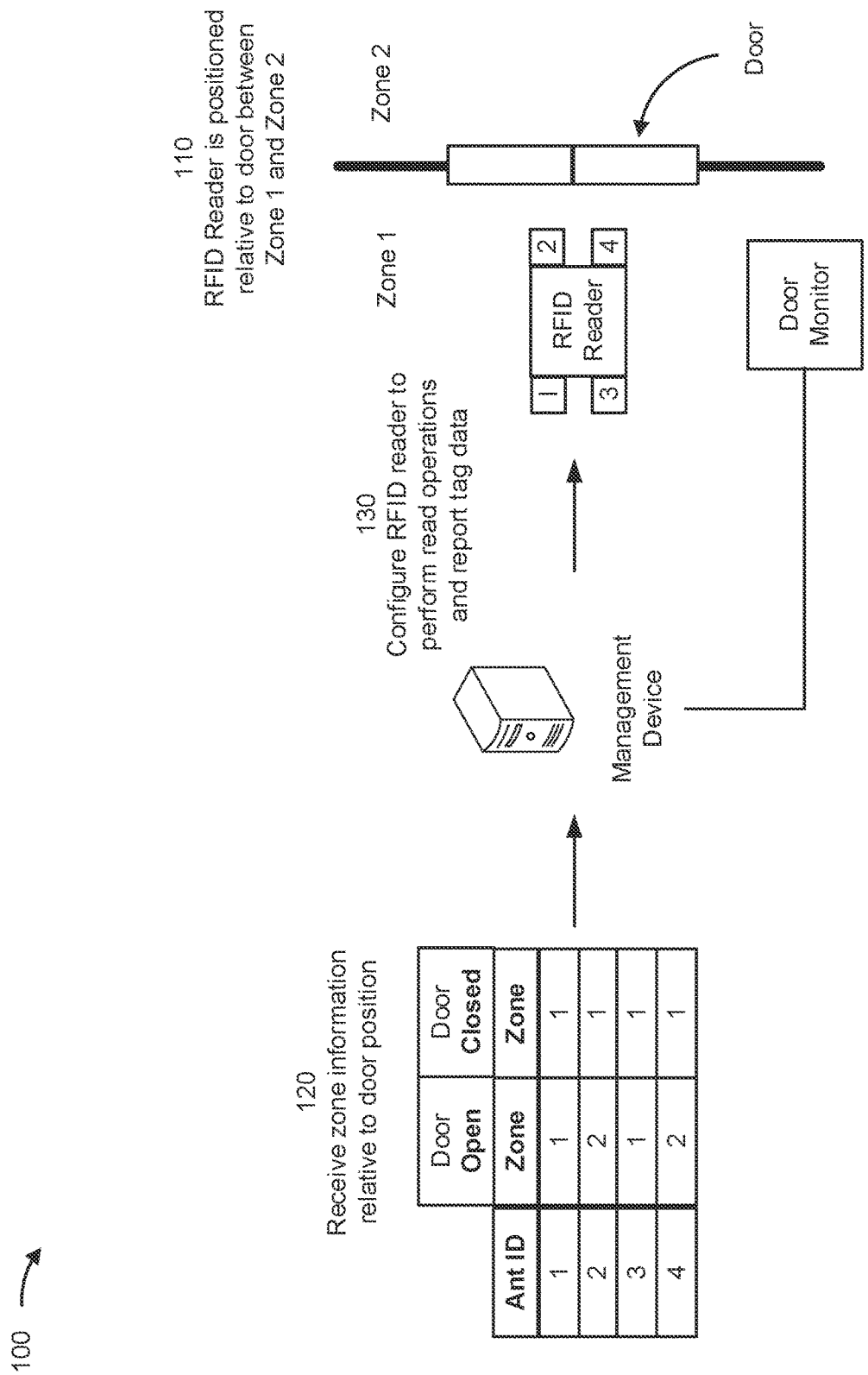
FIGS. 1A-1C are diagrams of an example implementation associated with a radio frequency identification (RFID) management system described herein.

The following detailed description of example implementations refers to the accompanying drawings. The same reference numbers in different drawings may identify the same or similar elements.

A system may be configured to track a location or movement of an object or an individual. For example, radio frequency identification (RFID) may be used within a system (an RFID-based system) to determine a location and/or a direction of movement of an object (e.g., a product or equipment). In an RFID-based system, an RFID tag may be embedded within and/or attached to the object and may be mapped to or associated with the object (e.g., using a data structure or a backend platform of the system). Accordingly, the system may infer that the object is in a particular location (e.g., the location of the RFID tag) of a physical environment and/or that the object is moving in a particular direction (e.g., the direction of movement of the RFID tag) within the physical environment. For example, the system may infer whether the object is within a room or outside of a room, whether the object has left or entered the room, whether the object is on an interior side of a doorway or an exterior side of a doorway, whether the object has passed through the doorway, and so on. Similarly, an RFID tag may be included within a wearable item (e.g., a bracelet or article of clothing) that is worn by an individual to track the location of the individual.

To track an RFID tag, an RFID-based system uses an RFID reader to emit a read signal to identify RFID tags within a physical environment of the RFID reader. The RFID reader may identify an RFID tag based on tag readings (e.g., received response signals) of the RFID tag that are received during a read window (e.g., a time period that follows an emission of the read signal). Based on a known location of the RFID reader within the physical environment, the RFID-based system can infer the location of an RFID tag (and/or an object associated with the tag) based on characteristics of the tag readings of the RFID tag determined during the read window. Furthermore, the RFID-based system may detect and/or identify movement characteristics of the RFID tag based on a variation associated with the tag readings. For example, based on a change in frequency of the response signals and/or a change in signal power of the response signals associated with the tag readings, the RFID-based system can infer that the RFID tag moved within the physical environment. Additionally, or alternatively, based on a majority of the response signals from the RFID tag switching from being received via a first antenna of the RFID reader to being received via a second antenna of the RFID reader, the RFID-based system can determine movement of the RFID tag in a direction that corresponds to the direction from the first antenna to the second antenna (e.g., because the first antenna and the second antenna may be directional antennas with different directional ranges).

An organization may use an RFID-based system to track and/or detect movement of an object from one location of a physical environment to another location of the physical environment. For example, a retail organization may use an RFID-based system to track movement of a product from a storage room of a store to a retail side of the store and/or from within the store to outside of the store. As another example, a construction business may use an RFID-based system to track movement of equipment from one area of a worksite to another area of the worksite. In such cases, an RFID reader may be placed near a boundary that is between the two locations. For example, the RFID reader may be placed near a doorway with a door that can be opened (e.g., to allow objects and/or individuals to pass through the doorway) or closed (e.g., to prevent objects or individuals from passing through the doorway). In such a case, the RFID reader may be configured to have an exterior-facing directional antenna with a directional range directed toward the door or the doorway (e.g., such that the door or doorway is positioned within the directional range) and an interior-facing directional antenna with a direction range directed away from the door or the doorway (e.g., such that the door or doorway is positioned outside of the directional range of the other antenna).

However, because of the nature of radio waves used in RFID, radio communications between an RFID reader and an RFID tag are susceptible to interference and/or multipath caused by physical characteristics of the physical environment. For example, a wall or door may reflect a read signal and/or response signal. Accordingly, for an RFID reader that is positioned near the doorway as mentioned above, the position of the door may impact whether the RFID reader accurately interprets or indicates a location of an RFID tag. More specifically, when a door of the doorway is closed, the RFID reader may receive tag readings via an exterior-facing directional antenna from an RFID tag on an interior side of the door. However, because the tag readings may reflect off the door, the RFID reader may inaccurately determine or indicate that the RFID tag is on an exterior side of the door (e.g., an opposite side of the doorway than the RFID reader). Further, in such a case, the RFID-based system may incorrectly determine that the RFID tag moved from the interior side of the door (if a tag reading from the RFID tag in a previous read window indicated that the RFID tag was on an interior side of the door) to the exterior side of the door (e.g., which may indicate to a retail organization that a product associated with the RFID tag was either stolen, purchased, or otherwise removed from the retail store). Therefore, there is a need to account for a position of the door to accurately interpret and/or indicate a position of an RFID tag (and/or object associated with the RFID tag) relative to the door.

A camera-based system may use a camera to detect and/or identify an object within a physical environment and/or track the movement of the object within the physical environment with relatively improved accuracy. However, the camera-based system needs to use one or more image processing techniques (e.g., object detection model, an object recognition model, and/or other type of computer vision model that is trained to identify the object) to process images from the cameras in a physical environment. Such image processing techniques are relatively compute intensive, and, therefore, a camera-based system requires consumption of relatively large amounts of computing resources (e.g., processing resources, memory resources, and/or power resources used to capture, analyze, and/or store the images) and/or network resources (e.g., communication resources and/or network bandwidth used to obtain the images) because the images involve relatively large amounts of data (e.g., an image may be one megabyte or more and multiple images may be required in order to identify an object and/or movement of the object).

Some implementations described herein include an RFID reader, within an RFID-based system, that uses a door monitor to determine a location status of one or more RFID tags in a physical environment (e.g., relative to the door). As described herein, the door monitor may indicate, in association with a read window and using one or more sensors, a position of the door to the RFID reader to permit the RFID reader to correspondingly interpret tag readings during the read window. For example, the RFID reader (and/or a management device of the RFID-based system) may receive door position information from the door monitor and process tag information associated with an RFID tag that is received via a directional antenna that faces the door (or doorway) according to a position of the door indicated in the door position information. In this way, the RFID reader may determine that the RFID tag is on an interior side of the door when the door is closed and an exterior side of the door when the door is open.

In this way, the RFID reader, as described herein, permits the RFID-based system to more accurately and robustly determine and/or indicate a location of an object within a physical environment (e.g., at least with respect to being on an interior side of a doorway or an exterior side of the doorway) relative to other RFID-based systems that do not utilize an RFID reader or door monitor as described herein. Therefore, the RFID-based system may operate with less errors and, correspondingly, may operate more efficiently. Furthermore, the RFID reader may permit an RFID-based system to consume fewer computing resources to identify a location of an object and/or track movement of the object, relative to a camera-based system, because measurements of a door monitor involve relatively smaller amounts of data than images from a camera, and/or because radio frequency (RF) communications between an RFID tag and an RFID reader involve relatively smaller amounts of data than images.

Figure 1B:
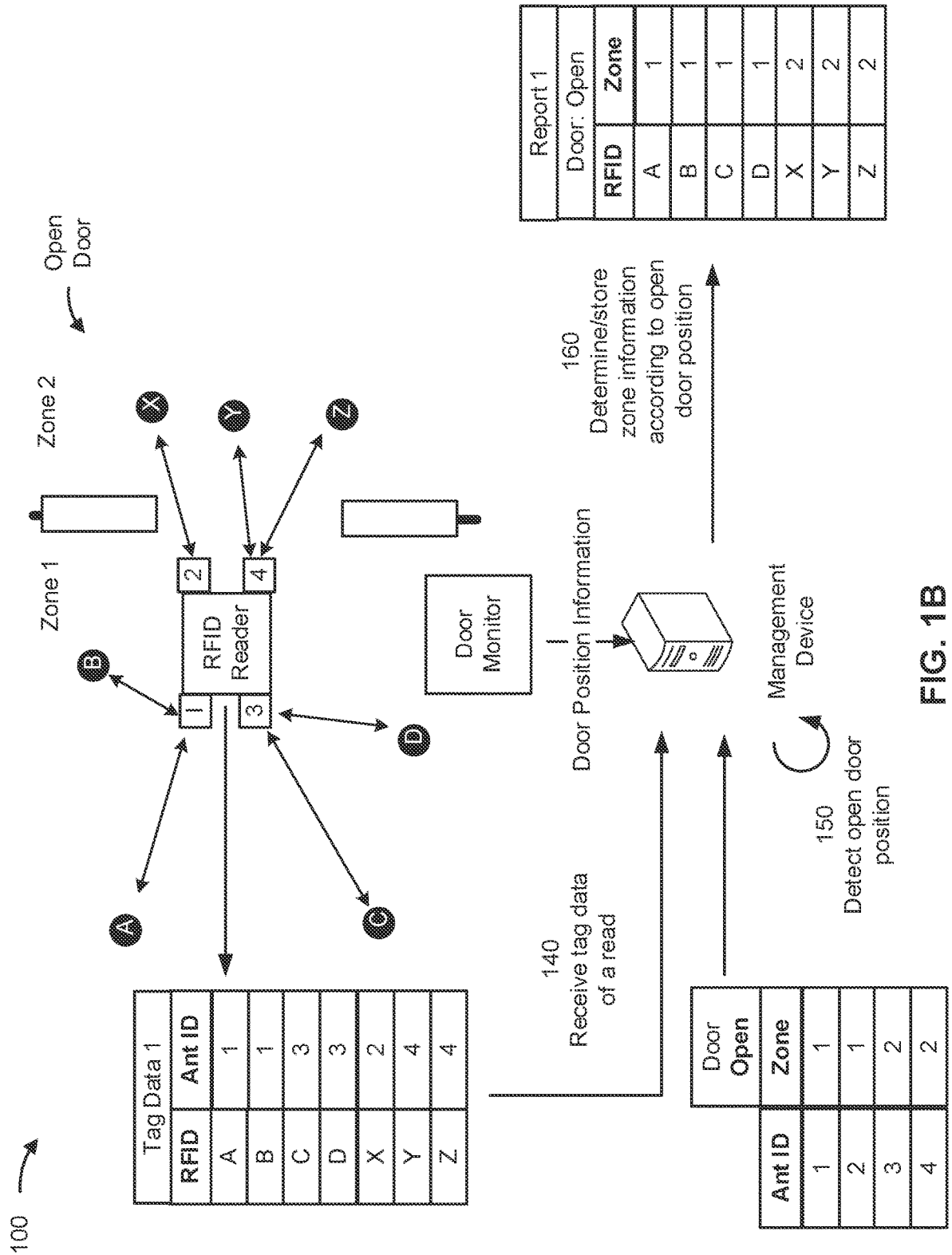
Figure 1C:
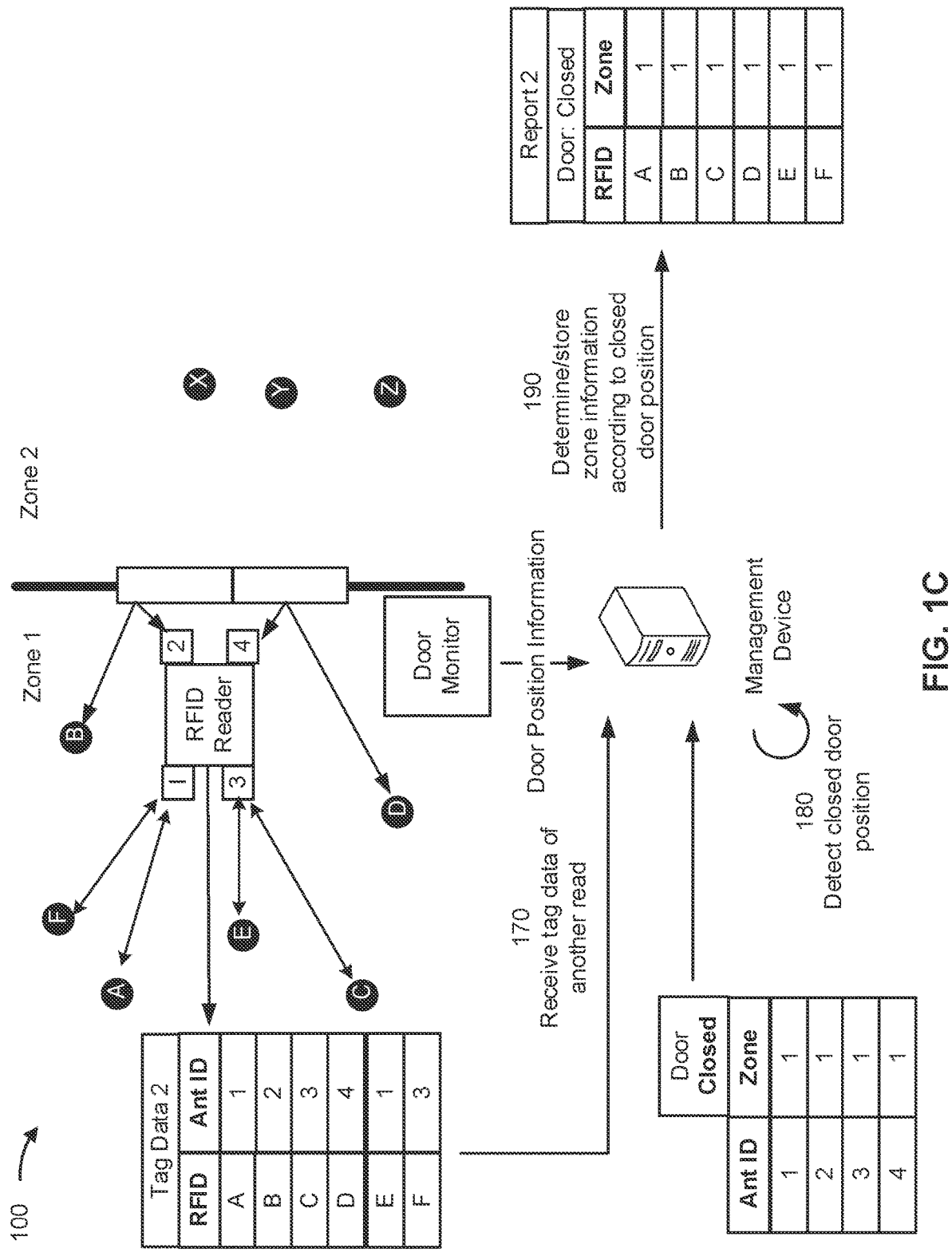

FIGS. 1A-1C are diagrams of an example implementation 100 associated with monitoring a door position to determine a status of an RFID tag, as described herein. As shown in FIGS. 1A-1C, example implementation 100 includes an RFID reader, a management device, and a door monitor.

These devices are further described below at least in connection with FIG. 3 and FIG. 4.

As shown in FIG. 1A, and by reference number 110, the RFID reader is positioned relative to a door. The door may separate zones of a physical environment. For example, Zone 1 may correspond to an interior of a room, a building, or other physical environment that is accessible via the door, and Zone 2 may correspond to an exterior of the room, the building, or other physical environment. Accordingly, as shown, Zone 1 may correspond to an interior side of the door (e.g., a same side of the door as the RFID reader), and Zone 2 may correspond to an exterior side of the door (e.g., an opposite side of the door as the RFID reader). The door may be any suitable type of door that is capable of being opened or closed. Although certain examples may be illustrated with a two-panel sliding door, any other type of door, such as a hinged door, a folding door, an overhead door, and/or a rolling door may similarly be monitored as described herein.

In example implementation 100, as shown, the RFID reader is positioned in Zone 1 or on an interior side of a door. Correspondingly, the RFID reader may be within a room, a building, or other physical environment that is accessible via the door.

The RFID reader, as shown in example implementation 100, may include multiple antennas (shown as 1, 2, 3, and 4). The individual antennas of the RFID reader may be directional antennas that are configured to receive and/or transmit signals (e.g., RFID communications) within a corresponding direction range. The directional ranges for two or more of the antennas of the RFID reader may be different from one another. For example, as described herein, a first antenna of the antennas (e.g., Antenna 2 or Antenna 4) may be configured to transmit and/or receive signals toward and/or from, respectively, a directional range that faces toward the door (e.g., the door may be within the directional range of Antenna 2 and/or Antenna 4). A second antenna of the antennas (e.g., Antenna 1 or Antenna 3) may be configured to transmit and/or receive signals toward and/or from, respectively, a directional range that faces away from the door (e.g., the door may be outside of the direction range of Antenna 1 and/or Antenna 3). Moreover, the directional range of the first antenna may not overlap the directional range of the second antenna. In this way, the RFID reader may interpret tag information received via the first antenna as being received from an exterior side (or door side) of the RFID reader and tag information received via the second antenna as being received from an interior side of the RFID reader that is opposite the door.

As further shown in FIG. 1A, and by reference number 120, the management device may receive zone information relative to a door position. For example, the management device may receive zone information relative to door position information that is to be provided by the door monitor. The management device may receive the zone information during a configuration or calibration of the management device, the RFID reader, and/or an RFID-based system of example implementation 100. For example, during a setup phase of the management device, the management device may be configured to determine a location status of an RFID tag based on which antenna of the RFID reader received tag information from the RFID tag and based on a door position of the door (whether the door was open or closed).

The door monitor may be configured to monitor, determine, and/or indicate a position of the door. For example, the door monitor may generate and/or provide door position information that indicates whether the door is open, closed, and/or between open and closed (e.g., based on a range between open and closed). In some implementations, the door monitor may indicate the position of the door relative to a read window or a time of the read window. For example, the door monitor may indicate within the door position information that the door was open during a read window (e.g., based on the door being open for greater than or equal to a threshold percentage of the read window) and/or closed during the read window (e.g., based on the door being closed for greater than or equal to the threshold percentage of the read window). Additionally, or alternatively, the door monitor may indicate within the door position information that the door was open or closed at a particular time of the read window (e.g., at a beginning of the read window, at an end of the read window, or at one or more points between the beginning and end of the read window).

As further shown in FIG. 1A, and by reference number 130, the management device may configure the RFID reader to perform read operations and/or report tag data. For example, the management device may control the RFID reader to obtain tag readings during a read window according to any suitable technique. In some implementations, the management device may instruct the RFID reader to perform a read operation based on a change in a position of the door (and/or movement of the door). For example, the management device may cause the RFID reader to perform a read operation based on detecting that the door opened or closed as indicated by the door monitor. Additionally, or alternatively, the management device may configure the RFID reader to perform read operations periodically or according to a certain schedule (e.g., to determine a location status of objects associated with RFID tags in Zone 1 and/or Zone 2).

As shown in FIG. 1B, the door is open. Furthermore, as shown in FIG. 1B, RFID tags A, B, C, and D are in Zone 1 and RFID tags X, Y, and Z are in Zone 2 (referred to collectively in connection with FIG. 1B as "the RFID tags").

As further shown in FIG. 1B and by reference number 140, the management device receives tag data of a read. For example, the management device may receive tag data from the RFID reader that is associated with a read (and/or tag readings) of the RFID tags. The read may correspond to a read operation performed by the RFID reader while the door was open (and/or in association with the door being opened). As indicate by Tag Data 1, the tag data may indicate via which antennas individual responses from the RFID were received.

As further shown in FIG. 1B, and by reference number 150, the management device may detect the open door position. For example, the management device may detect the open door position based on door position information received from the door monitor. Correspondingly, the management device, as shown, may designate the individual antennas of the RFID reader as being associated with corresponding zones (as configured according to the zone information). In some implementations, the management device may receive the door position information from the door monitor in association with the RFID reader performing the read operation.

As further shown in FIG. 1B, and by reference number 160, the management device determines and/or stores zone information according to the open door position. For example, based on determining that the door is in the open position (e.g., based on the door position information), the management device may determine a location status of one or more of the RFID tags. The location status may correspond to the location (and/or orientation) of the individual antennas of the RFID reader. Accordingly, as shown, the management device may determine and/or store a location status for the RFID tags A, B, C, and D (and/or objects associated with the RFID tags A, B, C, and D) to indicate that the RFID tags A, B, C, and D are within Zone 1 (e.g., to permit the management device to track the location of objects associated with the RFID tags A, B, C, and D). Furthermore, the management device may determine and/or store a location status for the RFID tags X, Y, and Z (and/or objects associated with the RFID tags X, Y, and Z) to indicate that the RFID tags X, Y, and Z are within Zone 2 (e.g., to permit the management device to track the location of objects associated with the RFID tags X, Y, and Z).

As shown in FIG. 1C, the door is closed. Furthermore, as shown in FIG. 1C, RFID tags A, B, C, D, E, and F are in Zone 1 and RFID tags X, Y, and Z are in Zone 2 (referred to collectively in connection with FIG. 1B as "the RFID tags").

As further shown in FIG. 1C, and by reference number 170, the management device receives tag data associated with another read. For example, similar to the management device receiving the tag data when the door was in the open position, the management device may receive the tag data based on the RFID reader performing a read operation while the door is closed (and/or in association with the door being closed). As indicated by Tag Data 2, the tag data may indicate via which antennas individual responses from the RFID tags were received.

As further shown in FIG. 1C, and by reference number 180, the management device may detect the closed door position. Similar to the management device detecting the door open position above, the management device may detect that the door is closed based on the door position information that is received from the door monitor. Accordingly, as shown, the management device may determine that the RFID tags are associated with Zone 1 regardless of which antenna received corresponding tag readings (e.g., because of the door being closed and the reflection of signals from the RFID tags A, B, C, D, E, and F. Furthermore, as shown by Tag Data 2, the RFID reader may not receive responses from the RFID tags X, Y, and Z because the door is closed and the transmissions or responses from the RFID tags X, Y, and Z likely would not penetrate the closed door.

As further shown in FIG. 1C, and by reference number 190, the management device determines and/or stores zone information according to the closed door position. For example, based on determining, based on the door position information, that the door is in a closed position, the management device may determine a location status for one or more of the RFID tags, as described above.

In some implementations, the management device may perform an action associated with determining a location of one or more of the RFID tags. For example, the management device may indicate (e.g., via a user interface and/or to a manager of the RFID-based system) that a first RFID tag (e.g., the RFID tag A) is within a room (e.g., a room or location associated with Zone 1) and/or that a second RFID tag (e.g., RFID tag X) is outside of the room (e.g., a room and/or location associated with Zone 2).

Accordingly, the management device, as described herein, may account for a door position and/or interference caused by a closed door when processing RFID tag data associated with RFID tags that are positioned inside or outside of the door in order to accurately determine a location of the RFID tags.

Figure 2A:
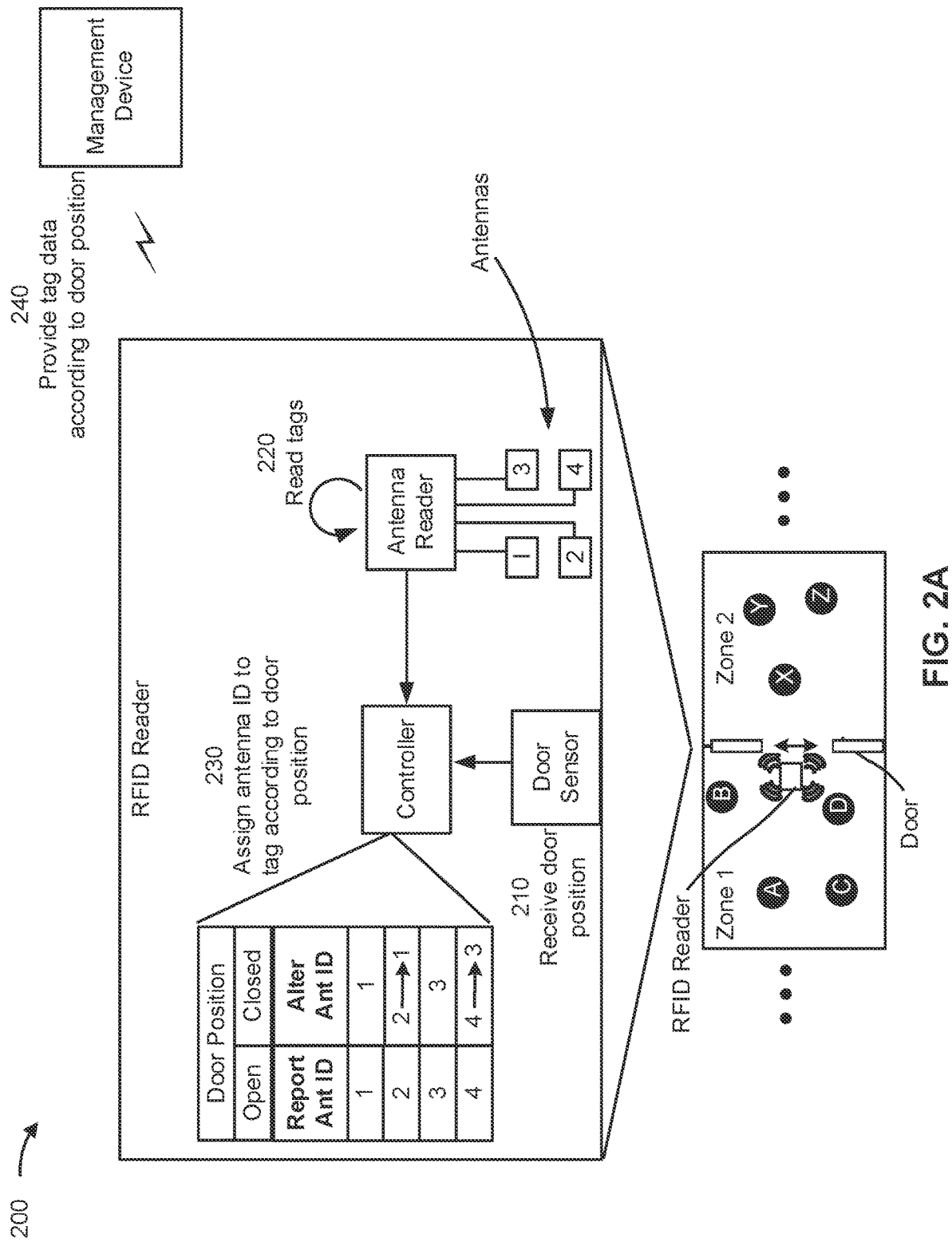
FIGS. 2A-2C are diagrams of an example implementation associated with an RFID reader described herein.
Figure 2B:
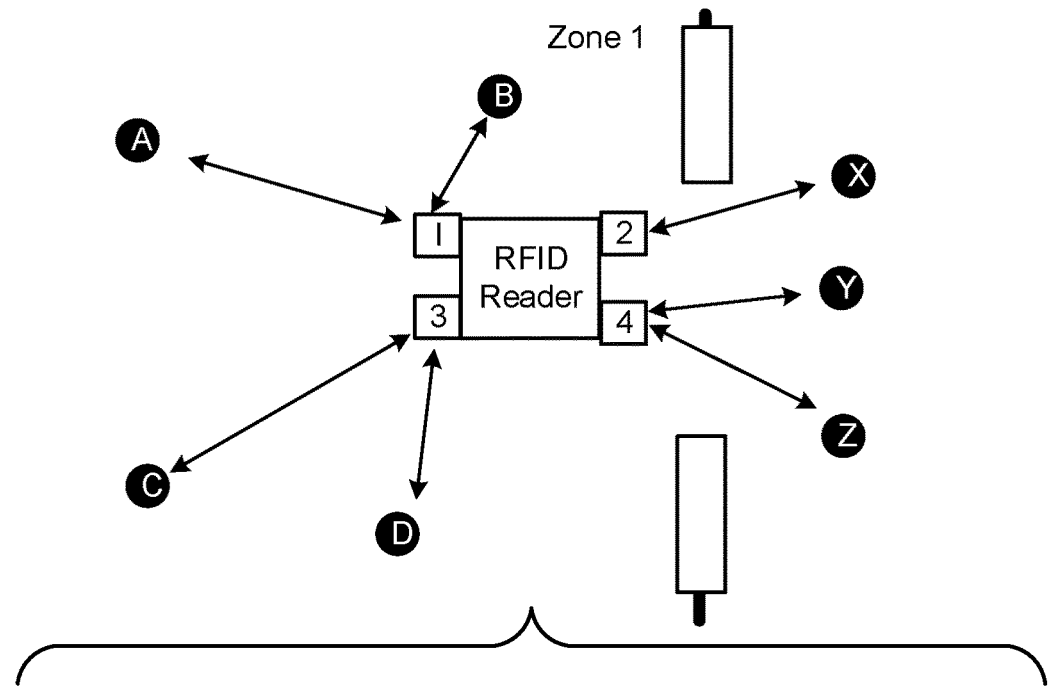
Figure 2C:
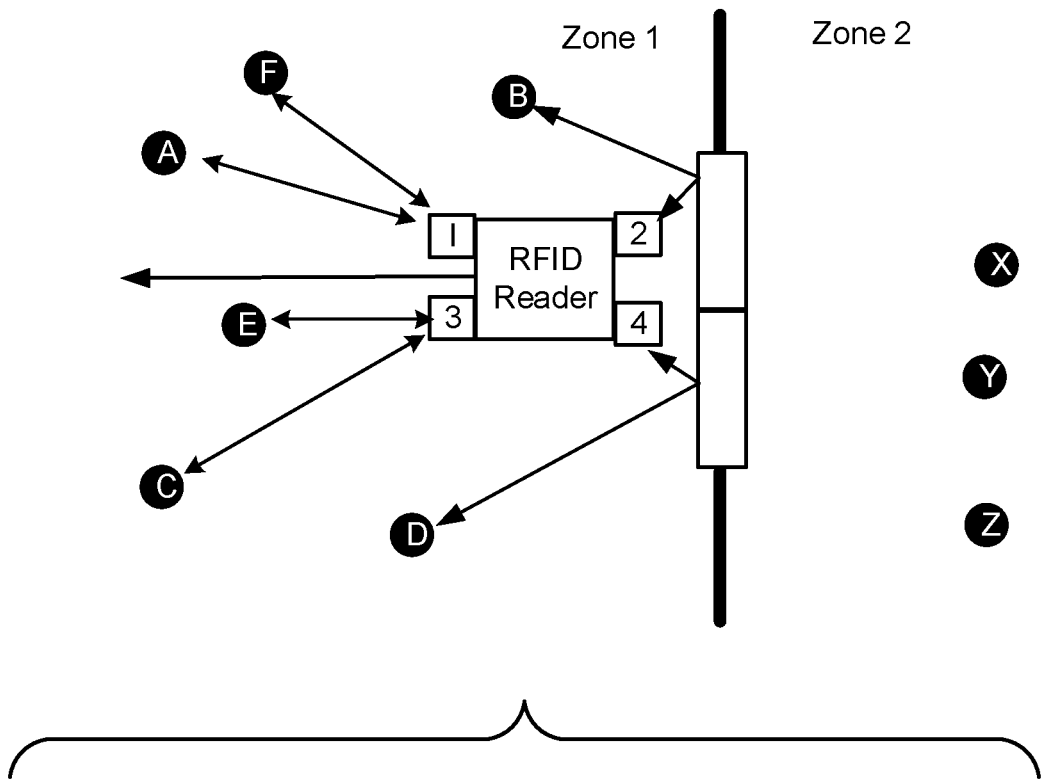

FIGS. 2A-2C are diagrams of an example implementation 100 associated with associated with monitoring a door position to determine a status of an RFID tag. As shown in FIGS. 2A-2C, example implementation 100 includes an RFID reader and a management device. These devices are further described below at least in connection with FIG. 3 and FIG. 4.

In example implementation 200, the RFID reader includes a controller, a plurality of directional antennas (which may be configured similar to the directional antennas of the RFID reader of example implementation 100), an antenna reader, and a door sensor. The RFID reader may use the door sensor to monitor a position of a door as described herein. Similar to example implementation 100, in example implementation 200, the RFID reader is configured within a physical environment with a first zone (Zone 1) on an interior of a door (or inside a room) and a second zone (Zone 2) on an exterior of the door (or outside the room). Furthermore, in example implementation 200, RFID tags may similarly be included within the first zone and the second zone as described in connection with example implementation 100.

As shown in FIG. 2A, and by reference number 210, the RFID reader receives door position information that indicates a position of a door of a room. The RFID reader may receive the door position information via the door sensor, in a similar manner as described above in connection with the door monitor of example implementation 100.

As further shown in FIG. 2A, and by reference number 220, the RFID reader reads tags. For example, the RFID reader may perform a read operation to identify the RFID tags as described herein. The RFID reader may read the tags via the antenna reader and identify which antenna receives which tag readings. The RFID reader may perform the read operation based on the door position information indicating a change in the position of the door (e.g., from open to closed, or closed to open).

As further shown in FIG. 2A, and by reference number 230, the RFID reader assigns an antenna identifier to the RFID tag according to the door position. For example, using a Door Position mapping, the controller of the RFID reader may assign an antenna identifier to the tags reported as received via certain antennas. More specifically, when the door is open, the controller may assign the antenna identifiers that correspond to the antennas that received the tags.

On the other hand, because a management device may be configured to interpret that a response received via a particular antenna indicates that the tag is associated with a location of that antenna, the RFID reader may alter the assigned antenna identifier for the response. For example, when the door is closed, the controller may alter one or more antenna identifiers associated with antennas that received the tags based on the door being closed. More specifically, as shown, when the door is closed, for a response received via Antenna 2 (based on Antenna 2 facing away from the door and/or according to zone information) the RFID reader may report that the response was received via Antenna 1. Similarly, for a response received via Antenna 4 (based on Antenna 4 facing away from the door) the RFID reader may report that the response was received via Antenna 3. In this way, the RFID reader may manipulate the tag data to cause the management device to interpret received tag data captured in association with the door being closed to determine that the RFID tags are located inside of the door.

As described herein, the RFID reader may generate, based on the position of the door and the tag information being received via a first antenna, tag data that indicates an antenna identifier associated with the first antenna. In some implementations, a value of the antenna identifier may be indicative of a location of the RFID tag. For example, the value may be mapped to a particular zone and/or a location (e.g., according to zone information and/or a mapping of a data structure).

As further shown in FIG. 2A, and by reference number 240, the RFID reader provides the tag data to the management device according to the door position. In some implementations, the RFID reader may store the tag data in a data structure of the RFID reader that is associated with tracking RFID tags within the room (or outside of the room). The data structure may be included within the RFID reader and/or communicatively coupled with the controller.

In this way, the RFID reader may perform an action associated with the tag data to enable a location of the first RFID tag to be identified according to the read operation As shown in FIG. 2B, and by reference number 230a, the RFID reader uses the read data as the tag data based on the door being open (e.g., when assigning the antenna identifier as described in connection with reference number 230). As shown in FIG. 2C, and by reference number 230b, the RFID reader may alter the antenna identifier of the read data to form tag data that is based on the door being closed.

In this way, the RFID reader may report tag information according to a door position of a door to account for interference caused by the door and/or cause a management device to accurately interpret or determine a location status associated with RFID tags read by directional antennas of the RFID reader.

As indicated above, FIGS. 1A-1C and 2A-2C are provided as an example. Other examples may differ from what is described with regard to FIGS. 1A-1C and 2A-2C. The number and arrangement of devices shown in FIGS. 1A-1C and 2A-2C are provided as an example. In practice, there may be additional devices, fewer devices, different devices, or differently arranged devices than those shown in FIGS. 1A-1C and 2A-2C. Furthermore, two or more devices shown in FIGS. 1A-1C and 2A-2C may be implemented within a single device, or a single device shown in FIGS. 1A-1C and 2A-2C may be implemented as multiple, distributed devices. Additionally, or alternatively, a set of devices (e.g., one or more devices) shown in FIGS. 1A-1C and 2A-2C may perform one or more functions described as being performed by another set of devices shown in FIGS. 1A-1C and 2A-2C.

Figure 3:
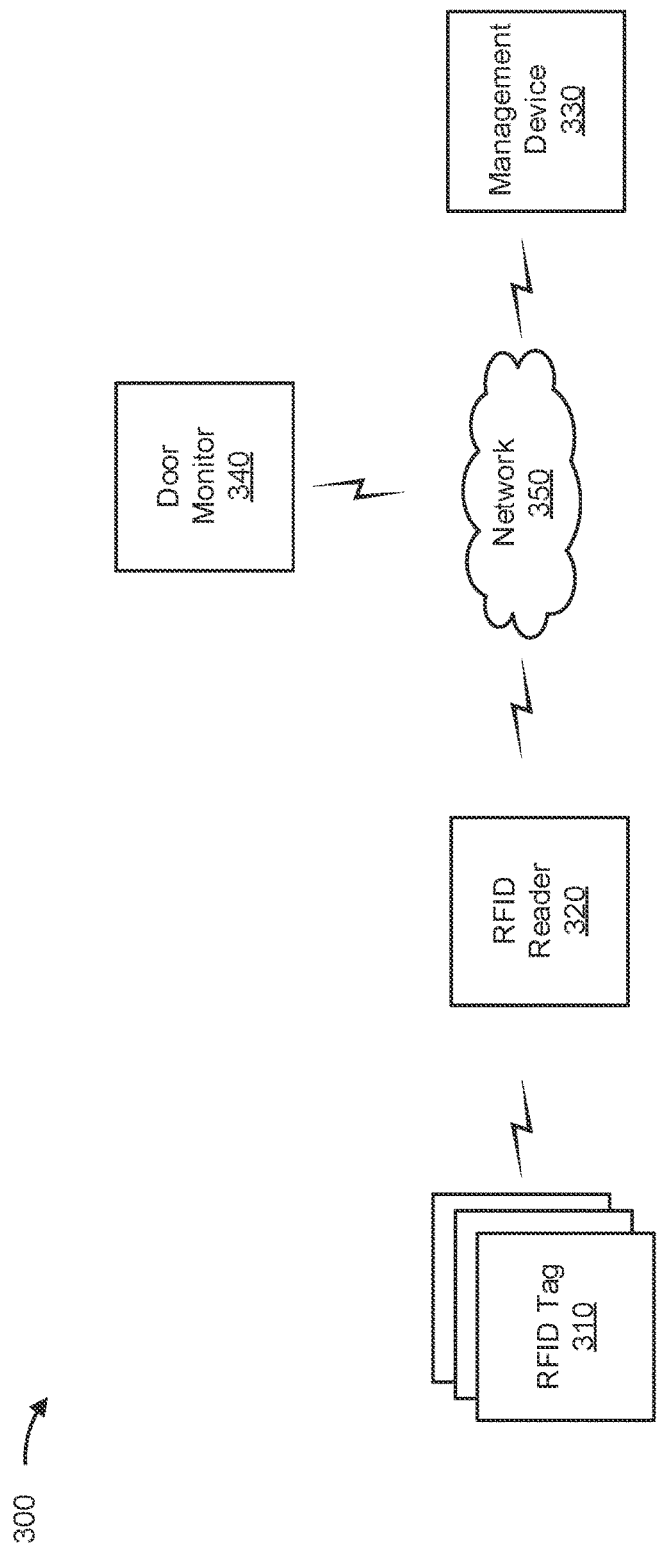
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include one or more RFID tags 310, an RFID reader 320, a management device 330, a door monitor 340, and a network 350. Devices of environment 300 may interconnect via wired connections, wireless connections, or a combination of wired and wireless connections.

The RFID tag 310 includes one or more devices capable of receiving, generating, storing, processing, and/or providing information associated with tracking a location of an object in a physical environment. For example, the RFID tag 310 may include a receiver, a transmitter, a transceiver, and/or a memory that stores an identifier of the RFID tag 310. The RFID tag 310 may be a passive RFID tag powered by received signals and/or an active RFID tag that is powered by a battery or other type of power supply.

The RFID reader 320 includes one or more devices capable of receiving, generating, storing, processing, and/or providing information associated with identifying a location status of an RFID tag (e.g., the RFID tag 310) based on a position of a door, as described herein. The RFID reader 320 may include a communication device and/or a computing device. The RFID reader 320 may include one or more RFID antennas (e.g., that have different directional ranges) and/or a sensor (e.g., the door monitor 340).

The Management device 330 includes one or more devices capable of receiving, generating, storing, processing, providing, and/or routing information associated with a location status of an object and/or an RFID tag (e.g., the RFID tag 310) in a physical environment, as described elsewhere herein. The Management device 330 may include a communication device and/or a computing device. For example, the Management device 330 may include a server, such as an application server, a client server, a web server, a database server, a host server, a proxy server, a virtual server (e.g., executing on computing hardware), or a server in a cloud computing system. In some implementations, the Management device 330 includes computing hardware used in a cloud computing environment.

The door monitor 340 includes one or more devices capable of receiving, generating, storing, processing, and/or providing information associated with a position of a door described herein. For example, the door monitor 340 may include a sensor that is configured to determine the position of the door based on sensor data (or a sensor measurement). The sensor may include a position sensor (e.g., mounted on or within the door and/or a threshold of the door), a motion sensor (e.g., mounted such that motion of the door is detectable within a field of view of the motion sensor), a pressure sensor (e.g., mounted on and/or within the door and/or a threshold of the door), an image sensor (e.g., a camera mounted such that the door is within a field of view of the camera), and/or any other type of sensor that enables the door monitor to identify and/or indicate a position of the door, as described herein.

The network 350 includes one or more wired and/or wireless networks. For example, the network 350 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 350 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
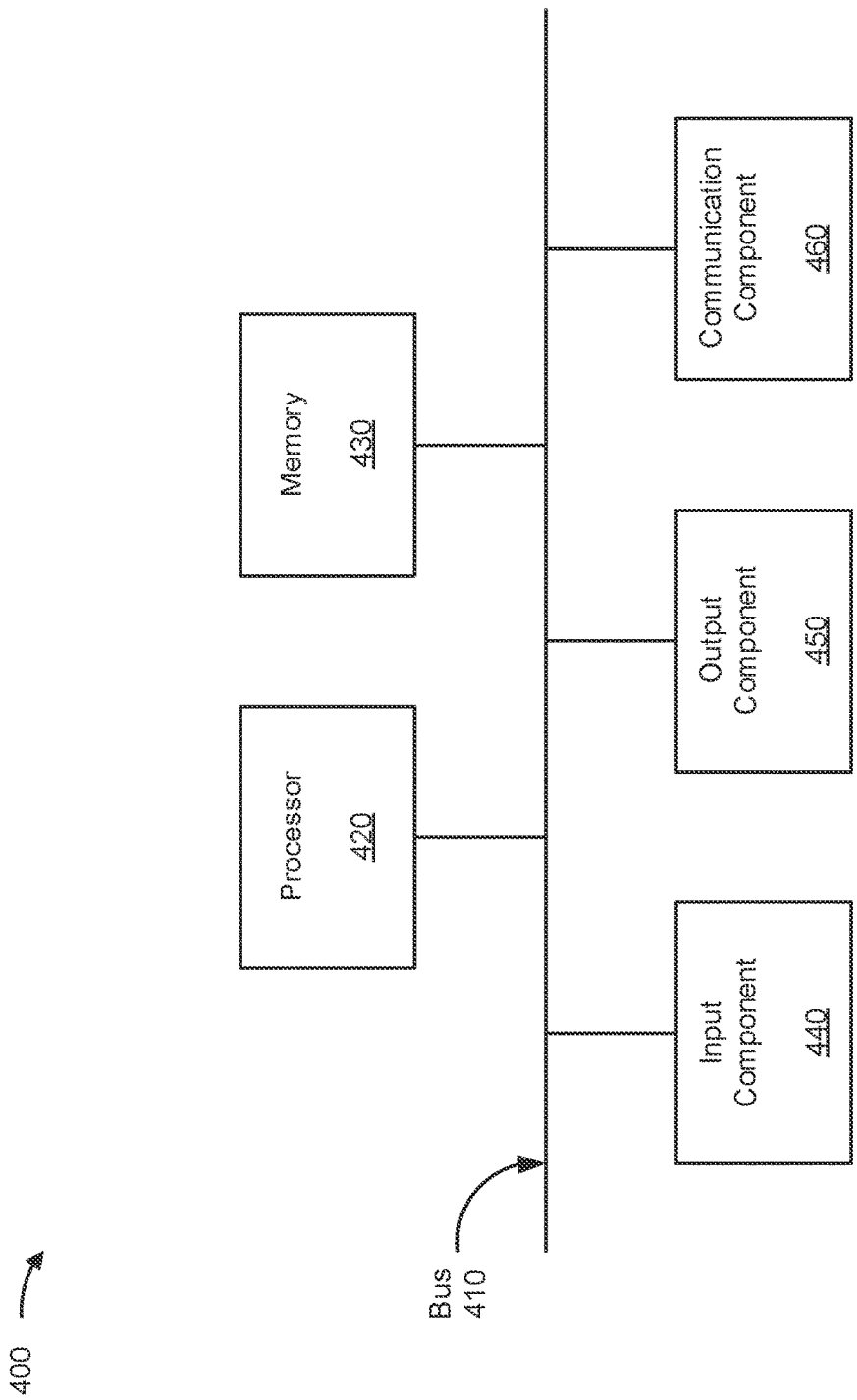
FIG. 4 is a diagram of example components of one or more devices of FIG. 3.

FIG. 4 is a diagram of example components of a device 400, which may correspond to the RFID tag 310, the RFID reader 320, the Management device 330, and/or the door monitor 340. In some implementations, the RFID tag 310, the RFID reader 320, the Management device 330, and/or the door monitor 340 may include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
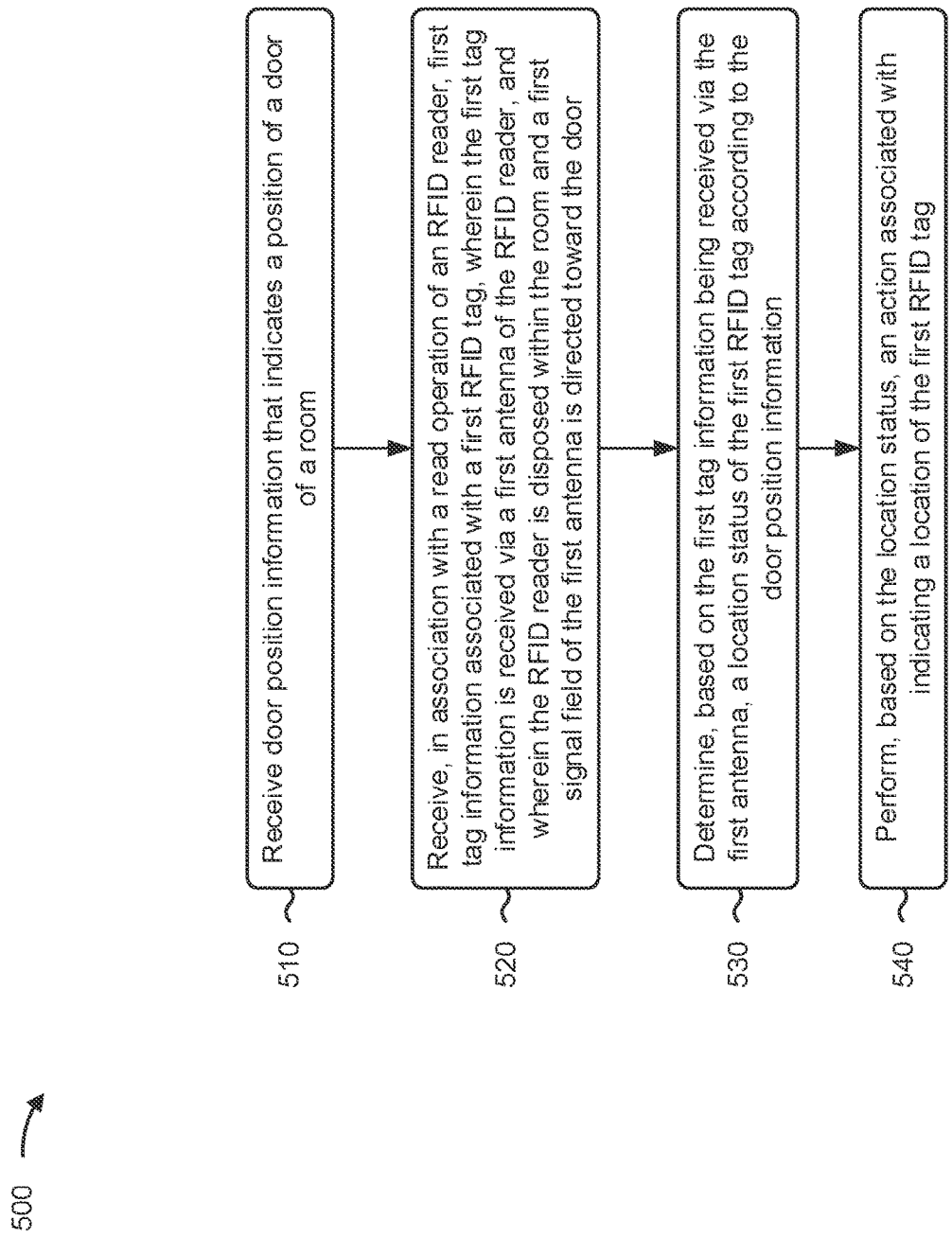
FIG. 5 is a flowchart of an example process associated with monitoring a door position to determine a status of an RFID tag.

FIG. 5 is a flowchart of an example process 500 associated with monitoring a door position to determine a status of an RFID tag. In some implementations, one or more process blocks of FIG. 5 are performed by an RFID reader (e.g., the RFID reader 320). In some implementations, one or more process blocks of FIG. 5 are performed by another device or a group of devices separate from or including the RFID reader, such as a management device (e.g., the management device 330) and/or a door monitor (e.g., the door monitor 340). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving door position information that indicates a position of a door of a room (block 510). For example, the RFID reader may receive door position information that indicates a position of a door of a room, as described above. The door position information may be received from a door sensor associated with the RFID reader (e.g., a door sensor that is within a housing of the RFID reader and/or that is communicatively coupled with the RFID reader).

As further shown in FIG. 5, process 500 may include receiving, in association with a read operation of an RFID reader, first tag information associated with a first RFID tag, wherein the first tag information is received via a first antenna of the RFID reader, and wherein the RFID reader is disposed within the room and a first directional range of the first antenna is directed toward the door (block 520). For example, the RFID reader may receive, in association with a read operation, the first tag information, as described above.

In some implementations, the first tag information is received via a first antenna of the RFID reader. The RFID reader may be disposed within the room and a first directional range of the first antenna may be directed toward the door. The management system may cause, based on the position, the RFID reader to perform the read operation, wherein the first tag information is received based on causing the RFID reader to perform the read operation.

As further shown in FIG. 5, process 500 may include determining, based on the first tag information being received via the first antenna, a location status of the first RFID tag according to the door position information (block 530). For example, the RFID reader may determine, based on the first tag information being received via the first antenna, a location status of the first RFID tag according to the door position information, as described above.

The RFID reader, when determining the location status when the door is in an open position, may determine, based on the door position information, that the door is in the open position and determine that the location status is associated with the location of the first RFID tag being outside of the room. Alternatively, the RFID reader, when determining the location status when the door is in the closed position, may determine, based on the door position information, that the door is in the closed position and determine that the location status is associated with the location of the first RFID tag being within the room.

As further shown in FIG. 5, process 500 may include performing, based on the location status, an action associated with indicating a location of the first RFID tag (block 540). For example, the RFID reader may perform, based on the location status, an action associated with indicating a location of the first RFID tag, as described above. The RFID reader, to perform the action, may store the location status of the first RFID tag in an RFID tag structure associated with tracking RFID tags within the room and/or provide, to a management device, an indication of the location of the first RFID tag.

In some implementations, the RFID reader may receive, in association with the read operation and via a second antenna of the RFID reader, second tag information associated with a second RFID tag. A second directional range of the second antenna may be directed away from the door. The RFID reader may determine, based on the second tag information being received via the second antenna, that the second RFID tag is within the room and indicate (e.g., to the management device) that the second RFID tag is within the room.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for processing radio frequency identification (RFID) tag information, comprising:
   receiving, by a device, door position information that indicates a position of a door of a room;
   receiving, by the device and in association with a read operation of an RFID reader, first tag information associated with a first RFID tag,
      wherein the first tag information is received via a first antenna of the RFID reader, and
      wherein the RFID reader is disposed within the room and a first directional range of the first antenna is directed toward the door;
   determining, by the device and based on the first tag information being received via the first antenna, a location status of the first RFID tag according to the door position information;
   performing, by the device and based on the location status, an action associated with indicating a location of the first RFID tag;
   receiving, in association with the read operation and via a second antenna of the RFID reader, second tag information associated with a second RFID tag,
      wherein a second directional range of the second antenna is directed away from the door;
   determining, based on the second tag information being received via the second antenna, that the second RFID tag is within the room; and
   indicating that the second RFID tag is within the room.

2. The method of claim 1, further comprising:
   causing, based on receiving the door position information, the RFID reader to perform the read operation,
      wherein the first tag information is received based on causing the RFID reader to perform the read operation.

3. The method of claim 1, wherein determining the location status comprises:
    determining, based on the door position information, that the door is in an open position; and
    determining that the location status is associated with the location of the first RFID tag being outside of the room based on determining that the door is in the open position.

4. The method of claim 1, wherein determining the location status comprises:
    determining, based on the door position information, that the door is in a closed position; and
    determining that the location status is associated with the location of the first RFID tag being within the room based on determining that the door is in the closed position.

5. The method of claim 1, wherein the door position information is received from a door sensor associated with the RFID reader.

6. The method of claim 1, wherein performing the action comprises at least one of:
    storing the location status of the first RFID tag in an RFID tag structure associated with tracking RFID tags within the room, or
    providing, to a management device, an indication of the location of the first RFID tag.

7. A radio frequency identification (RFID) reader, comprising:
    a plurality of antennas;
    one or more memories; and
    one or more processors, coupled to the one or more memories, configured to:
        receive door position information that indicates a position of a door of a room;
        perform a read operation to identify RFID tags;
        receive, based on the read operation, first tag information associated with a first RFID tag,
            wherein the first tag information is received via a first antenna of the plurality of antennas that has a first directional range that is directed toward the door, and
        generate, based on the position of the door and the first tag information being received via the first antenna, tag data that indicates an antenna identifier associated with the first tag information;
        perform an action associated with the tag data to enable a location of the first RFID tag to be identified according to the read operation;
        receive, in association with the read operation and via a second antenna of the RFID reader, second tag information associated with a second RFID tag,
        wherein a second directional range of the second antenna is directed away from the door; and
        indicate, within the tag data, that the second tag information is associated with a second antenna identifier that is associated with the second antenna.

8. The RFID reader of claim 7, wherein the one or more processors, to generate the tag data, are configured to:
    determine that the position of the door is an open position; and
    generate the tag data to indicate that the antenna identifier that is associated with the first tag information is an identifier associated with the first antenna.

9. The RFID reader of claim 7, wherein the one or more processors, to generate the tag data, are configured to:
    determine that the position of the door is a closed position; and
    generate the tag data to indicate that the antenna identifier that is associated with the first tag information is an identifier associated with a second antenna, of the plurality of antennas, that is different from the first antenna.

10. The RFID reader of claim 9, wherein a second directional range of the second antenna is directed away from the door.

11. The RFID reader of claim 7, wherein a value of the antenna identifier is indicative of a location of the first RFID tag.

12. The RFID reader of claim 7, wherein the read operation is performed based on the door position information indicating a change in the position of the door.

13. The RFID reader of claim 7, wherein the one or more processors, to perform the action, are configured to at least one of:
    store the tag data in a data structure associated with tracking RFID tags within the room, or
    provide, to a management device, the tag data to enable the management device to determine the location of the first RFID tag.

14. A system, comprising:
    a door monitor that is configured to indicate a position of a door;
    a radio frequency identification (RFID) reader that includes a first antenna and a second antenna,
        wherein the first antenna is disposed, within a room, nearer the door than the second antenna; and
    a management device that is configured to:
        receive, from the door monitor, door position information that indicates a position of the door;
        receive, in association with a read operation of the RFID reader, first tag information associated with a first RFID tag and second tag information associated with a second RFID tag,
            wherein the first tag information is received by the RFID reader via the first antenna and the second tag information is received by the RFID reader via the second antenna;
        determine, based on the first tag information being received via the first antenna, a location status of the first RFID tag according to the door position information;
        determine, based on the second tag information being received via the second antenna, that the second RFID tag is located within the room; and
        perform, based on the location status, an action associated with indicating a location of the first RFID tag and indicating that the second tag is located within the room.

15. The system of claim 14, wherein a first directional range of the first antenna is directed toward the door and a second directional range of the second antenna is directed away from the door.

16. The system of claim 14, wherein the management device, to determine the location status, is configured to:
    determine, based on the door position information, that the door is in an open position; and
    determine that the location status is to indicate that the location of the first RFID tag is outside of the room.

17. The system of claim 14, wherein the management device, to determine the location status, are configured to:
    determine, based on the door position information, that the door is in a closed position; and
    determine that the location status is to indicate that the location of the first RFID tag is within the room.

18. The system of claim 14, wherein the door position information is received from the door monitor in association with the RFID reader performing the read operation.

\* \* \* \* \*